Patented May 6, 1947

2,419,935

UNITED STATES PATENT OFFICE 2,419,935

MARIHUANA ACTIVE COMPOUNDS

Roger Adams, Urbana, Ill.

No Drawing. Application July 9, 1941,
Serial No. 401,656

27 Claims. (Cl. 260—333)

The present application is directed to pharmacological compounds characterized by marihuana activity and the process of preparing the same, and is a continuation-in-part of my co-pending application Serial No. 358,306, filed on September 25, 1940.

The subject matter of the present invention may be illustrated by the following basic reaction formulas.

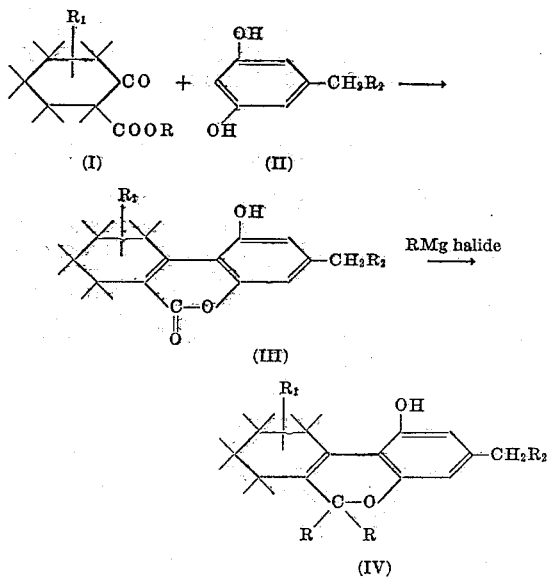

where R represents a lower alkyl group, $R_1$ represents hydrogen or a lower alkyl group and $R_2$ represents hydrogen or an alkyl group having 1–10 carbon atoms.

Formula I above represents a cyclohexanone-2-carboxylate of which ethyl cyclohexanone-2-carboxylate (I—A); ethyl 5-methyl-cyclohexanone-2-carboxylate (I—B); ethyl 4-ethyl-cyclohexanone-2-carboxylate (I—C); and propyl-6-butyl-cyclohexanone-2-carboxylate (I—D) are examples. These compounds which may be prepared by known processes (J. A. C. S., 62, 2405) may be illustrated by the following formulas:

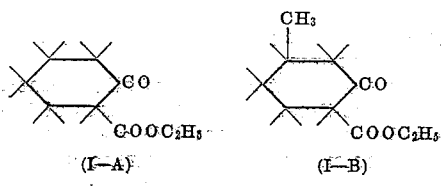

In Formula I—A above $R_1$ represents hydrogen. In the other formulas (I—B to I—D) $R_1$ represents a lower alkyl group which as shown in Formula I may be attached to either of the 3, 4, 5 or 6 positions.

Formula II above represents a 1,3-dihydroxy-5-alkyl benzene of which the 5-methyl-(orcinol) and 5-n-amyl-(olivetol) are typical examples. Other examples where $R_2$ represents the following alkyl groups are the methyl, ethyl, propyl, butyl, n-amyl, iso-amyl, hexyl, heptyl, 4-methyl-hexyl, 3-ethyl-amyl, octyl, nonyl and decyl derivatives. These compounds may be prepared by known processes (J. A. C. S., 61, 232), the preparation of the 1,3-dihydroxy-5-n-octylbenzene described in my co-pending pulegone condensation application, Serial No. 401,655, being illustrative.

In the preparation of the compounds of the present invention a cyclohexanone-2-carboxylate I is first condensed with a 1,3-dihydroxy-5-alkyl-benzene II to form a dibenzopyrone III. The benzopyrone is then reacted with a Grignard reagent to form the desired dibenzopyran IV. The following examples will serve to illustrate the present invention.

*Example I*

1-hydroxy-3-n-amyl-6,6,9 - trimethyl - 7,8,9,10-tetrahydro-6-dibenzopyran.

A solution of about 24 grams of 1,3-dihydroxy-5-n-amylbenzene (olivetol), 24 grams of ethyl 5-methyl-cyclohexanone - 2 - carboxylate and 16 grams of phosphorus oxychloride in 180 c. c. of dry benzene is first refluxed for about seven hours. After completion of the refluxing the reaction mixture is first washed with dilute aqueous sodium bicarbonate and is then washed with water. The benzene layer is then separated in the usual manner, the benzene evaporated and the residue (1-hydroxy-3-n-amyl-9 - methyl - 7,8,9,10 - tetrahydro-6-dibenzopyrone) after purification by recrystallization from ethyl acetate, is obtained as white needles with a melting point of 180°–181° C. If desired, the crude residue after crystallization from methanol may be converted to the pyran as described below.

A suspension of about 9 grams of 1-hydroxy- 3-n-amyl-9-methyl-7,8,9,10-tetrahydro-6-dibenzopyrone in 140 c. c. of solvent made up of about 3 parts of dry benzene and 1 part of dry di-n-butyl ether is next mixed with a solution Grignard reagent made up from about 9 grams of magnesium and 22.5 cc. of methyl iodide in 75 c. c. of dry ether and the total mixture then refluxed for about eight hours. After refluxing the reaction mixture is poured onto iced ammonium chloride solution, the organic layer separated, the aqueous layer extracted once with benzene and the combined benzene solutions washed successively with water, dilute aqueous sodium bicarbonate and water. The organic solvent (benzene, etc.) is then evaporated and the residue dissolved or taken up in about 150 c. c. of petroleum ether (B. P. 60-100° C.). About 10 drops of 48 per cent aqueous hydrobromic acid is next added to the petroleum ether solution which is then boiled on a hot plate for about thirty minutes while maintaining the volume substantially constant by addition of more solvent as necessary. After separation of the reaction solution, e. g., by decantation, from a small amount of insoluble material, the solvent is evaporated in the usual manner and the residue, 1-hydroxy-3-n-amyl-6,6,9-trimethyl-7,8,9,10-tetrahydro-6-dibenzopyran distilled. This product is obtained as a viscous oil, B. P. 175°-180° C. (0.02 mm., bath temperature 195°-200° C.); $n_D^{20}$ 1.5567. On standing it solidifies and may be purified by recrystallization from glacial acetic acid forming white crystals with a melting point of about 72°-73° C.

*Example II*

1-hydroxy-3-n-amyl-6,6-diethyl-9-methyl-7,8,9,10-tetrahydro-6-dibenzopyran.

By following the general process of Example I except for the use of an ethyl Grignard reagent (e. g., ethyl magnesium bromide) the 6,6-diethyl derivative may be obtained having a B. P. of about 185°-195° C. (0.02 mm., bath 200°-210° C.).

*Example III*

1-hydroxy-3-n-amyl-6,6-di-n-propyl-9-methyl-7,8,9,10-tetrahydro-6-dibenzopyran.

By following the general process of Example I except for the use of a propyl Grignard reagent (e. g., npropyl magnesium bromide) the 6,6-di-n-propyl derivative may be obtained as a red resin having a B. P. of about 200°-204° C. (2 mm., bath 225°-230° C.).

*Example IV*

1-hydroxy-3-n-amyl-7,8,9,10-tetrahydro-6-dibenzopyrone.

This pyrone intermediate may be prepared in accordance with the general process of Example I by condensing ethyl cyclohexanone-2-carboxylate with 1,3-dihydroxy-5-n-amylbenzene. Upon purification it forms white crystals with a melting point of 183°-183.5° C.

The desired pyran derivative may be prepared by reacting the pyrone intermediate with the proper alkyl Grignard reagent in accordance with the above examples. By using a methyl Grignard reagent in accordance with Example I the 1-hydroxy-3-n-amyl-6,6-dimethyl-7,8,9,10-tetrahydro-6-dibenzopyran is obtained as a viscous oil with a B. P. of 175°-180° C. (0.02 mm., bath 195°-200° C.).

*Example V*

1-hydroxy-3-n-amyl-8-methyl-7,8,9,10-tetrahydro-6-dibenzopyrone.

This pyrone intermediate may be prepared in accordance with the general process of Example I by refluxing for four hours about 6 grams of ethyl 4-methyl-cyclohexanone-2-carboxylate and 1,3-dihydroxy-5-n-amyl-benzene in about 55 cc. of dry benzene containing 4.8 grams of phosphorus oxychloride. After treating with excess aqueous sodium bicarbonate, cooling, washing with water and benzene and crystallization from methanol, the pyrone product is obtained as white crystals with a melting point of 169°-169.5° C.

The desired pyran derivative may be prepared by reacting the pyrone intermediate with the proper alkyl Grignard reagent in accordance with the above examples.

*Example VI*

1-hydroxy-3-n-heptyl-9-methyl-7,8,9,10-tetrahydro-6-dibenzopyrone.

This pyrone may be prepared in accordance with the general process of Example V by refluxing about 7.6 grams of 1,3-dihydroxy-5-n-heptylbenzene; 6.6 grams of ethyl 5-methyl cyclohexanone-2-carboxylate and 5.8 grams of phosphorus oxychloride in about 60 c. c. of dry benzene for about 5-6 hours. The product after purification melts at about 172°-173° C.

The desired pyran may be prepared by reacting the pyrone intermediate with the proper alkyl Grignard reagent in accordance with the above examples. By using the methyl Grignard reagent in accordance with Example I the 1-hydroxy-3-n-heptyl-6,6,9-trimethyl-7,8,9,10-tetrahydro-6-dibenzopyran is obtained with a B. P. of about 225°-228° C. (0.05 mm.).

*Example VII*

1-hydroxy-3-n-hexyl-6,6,9-alkyl-7,8,9,10-tetrahydro-6-dibenzopyran.

The pyrone intermediate for these products may be prepared by condensing 1,3-dihydroxy-5-n-hexylbenzene with the proper alkyl-cyclohexanone-2-carboxylate in accordance with the above examples. By using ethyl 5-methyl-cyclohexanone-2-carboxylate a pyrone product is obtained with a melting point of about 173°-174° C.

The pyran products may also be prepared in accordance with the above examples by reacting the pyrone with the proper alkyl Grignard reagent. By using the methyl Grignard reagent and the 9-methyl-pyrone product a 1-hydroxy-3-n-hexyl-6,6,9-trimethyl-7,8,9,10-tetrahydro-6-dibenzopyran is obtained with a B. P. of about 190°-192° C. (1 mm.). This product is of particular interest as it has been found to be over 75 per cent more active than the corresponding 3-n-amyl derivative of Example I. The 3-n-hexyl product (V) may be illustrated by the following formula:

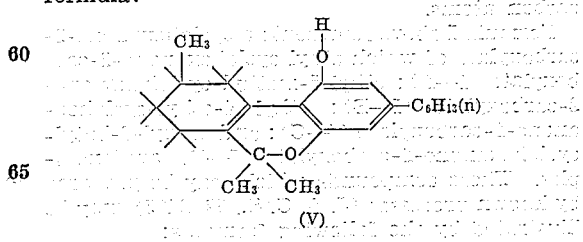

*Example VIII*

1-hydroxy-3-n-amyl-10-methyl-7,8,9,10-tetrahydro-6-dibenzopyrone.

A mixture of about 2 grams of ethyl 6-methyl-cyclohexanone-2-carboxylate; 2 grams of 1,3-dihydroxy-5-n-amyl benzene; 1.75 grams of phosphorus oxychloride; 5 cc. of benzene and 15 cc.

of toluene was refluxed for about 12 hours. It was then poured into excess saturated aqueous sodium carbonate solution and boiled until the solvent was removed. On cooling, the product was filtered and washed with benzene. White crystals, purified from a mixture of methanol and isopropanol have a melting point of about 194–194.5° C.

The 1-hydroxy - 3 - n-amyl - 6,6,10 - trimethyl-7,8,9,10-tetrahydro-6-dibenzopyran formed from the above pyrone in accordance with processes outlined above has a B. P. of about 181°–185° C. at 0.5–1.0 mm. (bath 214°–218° C.).

Additional examples prepared in accordance with the general processes outlined above are the 1- hydroxy-3-n-propyl - 6,6,9-trimethyl - 7,8,9,10-tetrahydro-6-dibenzopyran (B. P. 185° C., 2 mm.); 1-hydroxy-3 - n - butyl - 6,6,9 - trimethyl-7,8,9,10-tetrahydro-6-dibenzopyran (B. P. 178°–180° C., 1 mm.); 1-hydroxy-3-n-octyl-6,6,9-trimethyl - 7,8,9,10 - tetrahydro-6-dibenzopyran (B. P. 215°–220° C., 0.01 mm.), etc. Other pyran products coming within the scope of the present invention may be prepared by condensing the proper alkylated-cyclohexanone - 2 - carboxylate with the proper 1,3-dihydroxy-5-alkylated benzene and reacting the pyrone product obtained with the proper alkyl-magnesium-halide in accordance with the above examples.

The compound of Example 1 has the same empirical formula as the compound given the same name in my co-pending application, Serial Number 440,971. The difference therefrom is that, because it is synthetically derived from materials other than charas, it is definitely free of even chemical traces of nonacosane and certain terpenes and other contaminants found in products derived from hemp. It also may differ with respect to the position of the labile bonds in the all-carbon rings.

The products of the present invention form at the 1-position the monoacyl and monoalkyl ether derivatives. Upon reduction with one mole equivalent of hydrogen the double bond in the lefthand ring is eliminated and the corresponding hexahydro analogs are produced. These hexahydro products differ from the hexahydrocannabinol synthesized from cannabidiol by isomerization, followed by reduction, in that they are optically inactive. The pyran products of the present invention differ from the pyran products prepared from cannabidiol in the position of the double bond in the lefthand ring and from the pulegone condensation pyrans described in my copending application Serial No. 401,655 in that they are also optically inactive. The tetrahydrocannabinols prepared from cannabidiol by acidic isomerizing agents are described in my co-pending application Serial No. 352,931. Using very dilute ethanolic hydrochloric acid as the isomerizing agent a low rotating tetrahydrocannabinol α D—130±5° is produced, while using isomerizing agents such as p-toluene-sulfonic acid in benzene or a drop of sulfuric acid (100%) in cyclohexane a high rotating tetrahydrocannabinol α D—265±5° is produced. These products while optically active differ from the pulegone condensation pyrans in the position of the double bond on the lefthand ring.

The lower alkyl ethers (e. g., methyl, ethyl, etc.) and lower acyl derivatives (e. g., acetate, propionate, etc.) may be prepared in accordance with standard practices such as the processes described in my co-pending application Serial No. 352,931. The hexahydro products may also be prepared by reducing the tetrahydro products in accordance with the process described in my copending application.

The benzene and tetrahydro rings in the above formulas are shown in conventional manner. It will be understood in this connection that tetrahydro Formula A corresponds to Formula B as illustrated below:

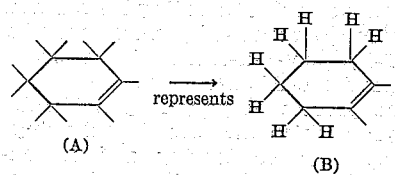

It will also be understood where $R_1$ is an alkyl group, that the alkyl group replaces one of the H atoms shown in Formula B.

The products of the present invention have utility in the therapeutic field as, for example, in the treatment of "dope" addicts and alcoholics. A specific use is to eliminate or ameliorate the withdrawal symptoms experienced in the treatment of opiate derivative addictions.

It will be obvious to those skilled in the art that the present invention is not limited to the illustrative examples described above. All modifications of the present invention are intended to be covered by the claims annexed hereto.

I claim:

1. The process of preparing a tetrahydrodibenzopyran which includes the following steps: (a) condensing an $R_1$-cyclohexanone-2-carboxylate with a 1,3-dihydroxy 5-$R_2CH_2$-benzene and (b) treating the pyrone reaction product formed by step (a) with an R-Grignard reagent to form the corresponding tetrahydro-6-dibenzopyran, where $R_1$ represents a member selected from the group consisting of hydrogen and lower alkyl groups, $R_2$ represents a member selected from the group consisting of hydrogen and alkyl groups having 1–10 carbon atoms and R represents a lower alkyl group.

2. The process of preparing a tetrahydrodibenzopyran which includes the following steps: (a) condensing a lower alkyl-cyclohexanone-2-carboxylate with a 1,3-dihydroxy 5-$R_2CH_2$-benzene and (b) treating the pyrone reaction product formed by step (a) with a lower alkyl-magnesium halide to form the corresponding tetrahydro-6-dibenzopyran, where $R_2$ represents a member selected from the group consisting of hydrogen and alkyl groups having 1–10 carbon atoms.

3. The process of preparing a tetrahydrodibenzopyran which includes the following essential steps: (a) condensing a lower alkyl-cyclohexanone-2-carboxylate with a 1,3-dihydroxy-5-amylbenzene and (b) treating the pyrone reaction product formed by step (a) with a lower alkyl magnesium halide to form the corresponding tetrahydro-6-dibenzopyran.

4. The process of preparing a tetrahydrodibenzopyran which includes the following essential steps: (a) condensing a lower alkyl-cyclohexanone-2-carboxylate with a 1,3-dihydroxy-5-hexylbenzene and (b) treating the pyrone reaction product formed by step (a) with a lower alkyl magnesium halide to form the corresponding tetrahydro-6-dibenzopyran.

5. The process of preparing a tetrahydrodibenzopyran which includes the following essential steps: (a) condensing a lower alkyl-cyclohexanone-2-carboxylate with a 1,3-dihydroxy-5- heptylbenzene and (b) treating the pyrone reaction product formed by step (a) with a lower alkyl magnesium halide to form the corresponding tetrahydro-6-dibenzopyran.

6. The process of preparing a tetrahydrodibenzopyran which includes the following essential steps: (a) condensing a 5-methyl-cyclohexanone-2-carboxylate with 1,3-dihydroxy-5-n-hexylbenzene, and (b) treating the reaction product of step (a) with methyl magnesium halide to form 1-hydroxy-3-n-hexyl-6,6,9-trimethyl-7,8,9,10-tetrahydro-6-dibenzopyran.

7. The process of preparing a tetrahydrodibenzopyran which includes the following essential steps: (a) condensing a 5-methyl-cyclohexanone-2-carboxylate with 1,3-dihydroxy-5-n-heptylbenzene, and (b) treating the reaction product of step (a) with methyl magnesium halide to form 1-hydroxy-3-n-heptyl-6,6,9-trimethyl-7,8,9,10-tetrahydro-6-dibenzopyran.

8. In the preparation of a tetrahydro-dibenzopyran, the process which includes the following steps: (a) condensing a cyclohexanone-2-carboxylate with a 1,3-dihydroxy-5-alkylbenzene in the presence of phosphorus oxychloride to form the corresponding dibenzopyrone intermediate, and (b) treating the pyrone intermediate with a lower alkyl Grignard reagent to form the corresponding dibenzopyran.

9. A tetrahydro-dibenzopyran product represented by the following formula:

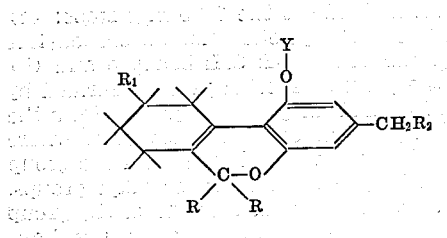

where $R_1$ represents a member selected from the group consisting of hydrogen and lower alkyl groups, $R_2$ represents a member selected from the group consisting of hydrogen and alkyl groups having 1–10 carbon atoms, R represents lower alkyl groups and Y is selected from the group consisting of hydrogen and lower alkyl and acyl groups; said product being substantially free of cannabidiol and of toxic impurities, and optically inactive.

10. A product represented by the formula of claim 9 in which $R_2$ is a butyl group.

11. A tetrahydro-dibenzopyran product represented by the following formula:

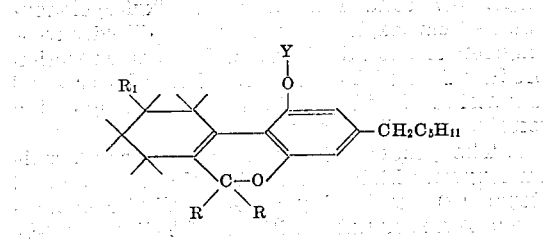

where $R_1$ represents a member selected from the group consisting of hydrogen and lower alkyl groups, R represents lower alkyl groups and Y is selected from the group consisting of hydrogen and lower alkyl and acyl groups.

12. A product represented by the formula of claim 9 in which $R_2$ is a hexyl group.

13. A product represented by the formula of claim 9 in which $R_1$ is a lower alkyl group, $R_2$ is a n-butyl group and Y is hydrogen.

14. A product represented by the formula of claim 11 in which $R_1$ is a lower alkyl group, the $C_5H_{11}$ is a n-amyl group, and Y is hydrogen.

15. A product represented by the formula of claim 9 in which $R_1$ is a lower alkyl group, $R_2$ is a n-hexyl group and Y is hydrogen.

16. A tetrahydro-dibenzopyran product represented by the following formula:

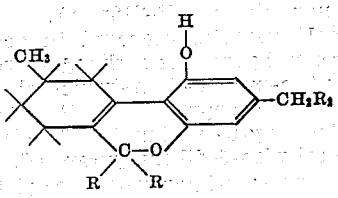

in which $R_2$ is selected from the group consisting of hydrogen and alkyl groups having 1 to 10 carbon atoms and R represents lower alkyl groups; said product being substantially free of cannabidiol and of toxic impurities, and optically inactive.

17. A product represented by the formula of claim 16 in which $R_2$ is a butyl group.

18. A tetrahydro-dibenzopyran product represented by the following formula:

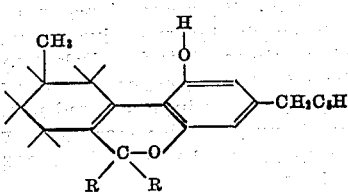

in which R represents lower alkyl groups.

19. A product represented by the formula of claim 16 in which $R_2$ is a hexyl group.

20. The product 1-hydroxy-3-n-amyl-6,6,9-trimethyl-7,8,9,10-tetrahydro-6-dibenzopyran; said product being substantially free of cannabidiol and of toxic impurities, and optically inactive.

21. The product, 1-hydroxy-3-n-hexyl-6,6,9-trimethyl-7,8,9,10-tetrahydro-6-dibenzopyran.

22. A product represented by the formula of claim 16 in which the Rs represent methyl groups and $R_2$ a n-hexyl group.

23. As chemical intermediates useful in organic synthesis, tetrahydrodibenzopyrones having all four extra hydrogens on the same all-carbon ring remote from the oxygen of the pyrone ring.

24. As chemical intermediates useful in organic synthesis, dibenzopyrone substituted in 1 position by a group selected from the class hydroxy, acyloxy and alkoxy; substituted in 3 position by a group $CH_2R$ in which R is selected from the class alkyl having from one to ten carbon atoms; substituted once in the all-carbon ring remote from the oxygen of the pyrone ring by methyl in a position selected from the class, 8, 9, 10.

25. As a chemical intermediate useful in organic synthesis, 1-hydroxy-3-n-amyl-9-methyl-7,8,9,10-tetrahydro-6-dibenzopyrone.

26. As a chemical intermediate useful in organic synthesis, 1-hydroxy-3-n-hexyl-9-methyl-7,8,9,10-tetrahydro-6-dibenzopyrone.

27. The process of preparing a tetrahydro-dibenzopyran which includes the following essential steps: (a) condensing a 5-methyl-cyclohexanone-2-carboxylate with 1,3-dihydroxy-5-n-amylbenzene, and (b) treating the reaction product of step (a) with methyl magnesium halide to form 1-hydroxy-3-n-amyl - 6,6,9 - trimethyl - 7,8,9,10-tetrahydro-6-dibenzopyran.

ROGER ADAMS.

REFERENCES CITED

The following references are of record in the file of this patent:

FOREIGN PATENTS

| Number | Country | Date |
|--------|---------|------|
| 285,829 | Germany | July 12, 1915 |

OTHER REFERENCES

Frankel-Archiv fur Experimentelle Pathologie und Pharmakologie (1902–1903), vol. 49, pp. 272–284.

Haagen-Smit. Science, June 21, 1940, pages 602–603.

Dispensatory of U. S. of America, Wood-Lawall, 21st ed., pages 277–281. (Copy in Division 43.)

Wollner et al., Journal American Chem. Soc., Jan. 1942, pages 26–29.

Chem. Abstracts, 1929, page 383, citing: Journal Indian Chem. Soc., vol. 5, pages 467–76 (1928).

Blatt, Journal of Washington Academy of Sciences, vol. 28 (1938), pages 465–476.

Journal Amer. Chem. Soc., vol. 62, March, 1940, pages 2401–08.